(12) United States Patent
Yelle

(10) Patent No.: US 12,523,039 B2
(45) Date of Patent: Jan. 13, 2026

(54) VENTED INSULATED ROOF SHEATHING

(71) Applicant: LOUISIANA-PACIFIC CORPORATION, Nashville, TN (US)

(72) Inventor: Jeffrey Yelle, Hendersonville, TN (US)

(73) Assignee: LOUISIANA-PACIFIC CORP., Nashville, TN (US)

(*) Notice: Subject to any disclaimer, the term of this patent is extended or adjusted under 35 U.S.C. 154(b) by 143 days.

(21) Appl. No.: 17/535,088

(22) Filed: Nov. 24, 2021

(65) Prior Publication Data

US 2022/0162857 A1 May 26, 2022

Related U.S. Application Data

(60) Provisional application No. 63/117,513, filed on Nov. 24, 2020.

(51) Int. Cl.
*E04C 2/52* (2006.01)
*B32B 3/26* (2006.01)
(Continued)

(52) U.S. Cl.
CPC ............. *E04C 2/523* (2013.01); *B32B 3/26* (2013.01); *B32B 5/18* (2013.01); *B32B 15/046* (2013.01); *B32B 15/10* (2013.01); *B32B 21/02* (2013.01); *B32B 21/047* (2013.01); *E04C 2/243* (2013.01); *E04D 13/172* (2013.01);
(Continued)

(58) Field of Classification Search
CPC ....... E04C 2/523; E04C 2/243; E04D 13/172; B32B 3/26; B32B 5/18; B32B 15/046; B32B 21/047; B32B 2266/0214; B32B 2266/0228; B32B 2307/304; B32B 15/10; B32B 21/02
See application file for complete search history.

(56) References Cited

U.S. PATENT DOCUMENTS 4,492,064 A * 1/1985 Bynoe ............... E04D 13/172
52/309.8
4,852,314 A * 8/1989 Moore, Jr. .......... E04D 13/1618
52/95
(Continued)

FOREIGN PATENT DOCUMENTS

DE 2030496 A1 * 6/1972
EP 0102408 A1 * 3/1984
EP 0834625 A1 * 4/1998

*Primary Examiner* — Adriana Figueroa
(74) *Attorney, Agent, or Firm* — Wayne Edward Ramage; Baker Donelson

(57) ABSTRACT

An integrated roofing product comprising a wood or cellulosic structural or roof sheathing base or core panel with a rigid foam insulation sheet or layer laminated or otherwise attached to the panel's inner face. Shingles and/or other protective material may then be attached to the panel's outer face. A plurality of parallel air channels extend vertically in the rigid foam insulation sheet or layer, providing a pathway for air to pass up and out of the eave space. Some or all of the air channels are disposed on the surface of the foam layer that is laminated or attached to the panel's inner face, so that part of the air channel is formed at the interface. A radiant barrier layer may be placed on the inner face of the rigid foam insulation sheet or layer, or between the foam insulation and the inner face of the roof sheathing base or core panel.

11 Claims, 8 Drawing Sheets

(51) Int. Cl.
  *B32B 5/18*   (2006.01)
  *B32B 15/04*  (2006.01)
  *B32B 15/10*  (2006.01)
  *B32B 21/02*  (2006.01)
  *B32B 21/04*  (2006.01)
  *E04C 2/24*   (2006.01)
  *E04D 13/17*  (2006.01)

(52) U.S. Cl.
  CPC .............. *B32B 2266/0214* (2013.01); *B32B 2266/0228* (2013.01); *B32B 2307/304* (2013.01); *B32B 2307/732* (2013.01); *B32B 2419/06* (2013.01)

(56) References Cited

U.S. PATENT DOCUMENTS

| | | | | |
|---|---|---|---|---|
| 4,937,990 A * | 7/1990 | Paquette | ............... | E04D 13/172 52/302.3 |
| 5,369,926 A * | 12/1994 | Borland | ................ | E04D 11/02 52/309.17 |
| 5,473,847 A * | 12/1995 | Crookston | ............. | E04C 2/205 52/95 |
| 6,557,313 B1 * | 5/2003 | Alderman | ............. | E04B 1/7662 52/407.3 |
| 8,572,917 B2 * | 11/2013 | Gartz | ................... | E04F 15/185 52/309.4 |
| 8,769,894 B2 * | 7/2014 | Power | ................... | E04B 1/7076 52/302.1 |
| 10,480,188 B2 * | 11/2019 | Power | ................ | E04F 13/0875 |
| 11,214,966 B2 * | 1/2022 | Dysart | ...................... | E04B 7/02 |
| 2004/0134137 A1 * | 7/2004 | Geer | .................... | E04D 13/158 52/95 |
| 2006/0117686 A1 * | 6/2006 | Mankell | ............. | E04D 13/1625 52/302.1 |
| 2006/0179748 A1 * | 8/2006 | Schmidt | ................... | E04B 1/80 52/302.1 |
| 2006/0230707 A1 * | 10/2006 | Roe | ..................... | E04D 13/1618 52/794.1 |
| 2007/0094966 A1 * | 5/2007 | Snyder | ............... | E04D 13/1625 52/309.1 |
| 2010/0325990 A1 * | 12/2010 | Taraba | .................... | E04C 2/34 52/302.1 |

* cited by examiner

VENTED INSULATED ROOF SHEATHING

This application claims benefit of and priority to U.S. Provisional App. No. 63/117,513, filed Nov. 24, 2020, which is incorporated herein in its entirety by specific reference for all purposes.

FIELD OF INVENTION

This invention relates to a wood or cellulosic structural or roof sheathing panel with rigid foam insulation with ventilation channels.

BACKGROUND OF INVENTION

Current roof assemblies are typically multiple layers of several materials, each performing a single function, that are installed separately on the site in which the building is being constructed. In many roofing systems, there is a deck, an underlayment barrier on top of the deck, covered by a surface layer of shingles (e.g., asphalt, ceramic, metal, and the like). Compatibility between the various layers creates challenges not only for the designer, but also for the installers. In addition, a varied and large amount of materials are required during the installation, as well as during maintenance (e.g., re-roofing).

A central layer in most such assembles in a wood panel product, or an integral composite engineered panel product, including, but not limited to, engineered wood composite products formed of lignocellulosic strands or wafers (sometimes referred to as oriented-strand board, or OSB). Products such as fiberboard and particleboard have been found to be acceptable alternatives in most cases to natural wood paneling, sheathing and decking lumber. Fiberboard and particleboard are produced from wood particles bonded together by an adhesive, the adhesive being selected according to the intended use of and the properties desired for the lumber. Often times, the adhesive is combined with other additives to impart additional properties to the lumber. Additives can include, but are not limited to, fire retardants, insect repellants, moisture resistant substances, fungicides and fungal resistant substances, and color dyes. A significant advantage of fiberboard and particleboard lumber products is that they have many of the properties of plywood, but can be made from lower grade wood species and waste from other wood product production, and can be formed into lumber in lengths and widths independent of size of the harvested timber.

A major reason for increased presence in the marketplace of the above-described product alternatives to natural solid wood lumber is that these materials exhibit properties like those of the equivalent natural solid wood lumber, especially, the properties of retaining strength, durability, stability and finish under exposure to expected environmental and use conditions. A class of alternative products are multilayer oriented wood strand particleboards, particularly those with a layer-to-layer oriented strand pattern, such as OSB. Oriented, multilayer wood strand boards are composed of several layers of thin wood strands, which are wood particles having a length which is several times greater than their width. These strands are formed by slicing larger wood pieces so that the fiber elements in the strands are substantially parallel to the strand length. The strands in each layer are positioned relative to each other with their length in substantial parallel orientation and extending in a direction approaching a line which is parallel to one edge of the layer. The layers are positioned relative to each other with the oriented strands of adjacent layers perpendicular, forming a layer-to-layer cross-oriented strand pattern. Oriented, multilayer wood strand boards of the above-described type, and examples of processes for pressing and production thereof, are described in detail in U.S. Pat. Nos. 3,164,511, 4,364,984, 5,435,976, 5,470,631, 5,525,394, 5,718,786, and 6,461,743, all of which are incorporated herein in their entireties by specific reference for all purposes.

Roof ventilation is an important part of the building process and service life of a house. A roof without good airflow can result in mold and other wood decay organisms growing under it, due to the increased temperature and moisture content of the environment in the area under the roof, which generates optimal growth conditions for the aforementioned organisms. In contrast, however, a roof with excessive ventilation can cause energy loss by not providing effective temperature regulation (i.e., by letting too much cold and/or hot air escape from the house), thus requiring HVAC and/or AC systems to operate more frequently and increase their energy consumption.

Present methods to ventilate the roof include leaving a gap between the roof sheathing and the edge of the ridge. This gap is then covered with a felt fabric and a ridge cap (some products have the felt integrated with the ridge cap). The ridge cap might have channels to promote air movement. Another method comprises the installers cutting rectangle shaped sections (i.e., exhaust vents) at the ridge of the roof, then covering them with felt and a ridge cap. This latter method relies on the accuracy and experience of the roofer, as the size of the cut off will affect the roof ventilation.

SUMMARY OF INVENTION

In various exemplary embodiments, as seen in FIGS. 1 and 2, the present invention comprises an integrated roofing product comprising a base or core wood or cellulosic structural or roof sheathing panel with a rigid foam insulation sheet or layer laminated or otherwise attached to the panel's inner face. Shingles and/or other protective material may then be attached to the panel's outer face (this attachment of the shingles or other protective material may take place after installation of the integrated roofing product, or may take place in a production line or process at the factory, so that the shingles or outer protective material are part of the integrated roofing product).

A plurality of parallel air channels extend vertically in the rigid foam insulation sheet, providing a pathway for air to pass up and out of the eave space. In one exemplary embodiment, some or all of the air channels are disposed on the surface of the foam layer that is laminated or attached to the panel's inner face, so that part of the air channel is formed at the interface. In this configuration, the upper part of the air channel is formed by the inner face of the panel.

In several embodiments, the base or core panel comprises an oriented strand board (OSB) or other manufactured wood panel. The panel may be of any size suitable for the roofing installation, and a common size is 4 feet wide by 8 feet long, with a thickness ranging from ⅜" to ¹⁹⁄₃₂". The rigid foam insulation panel comprises expanded polystyrene (EPS), extruded polystyrene (XPS), graphite polystyrene (GPS), or polyisocyanurate (Poly-Iso), or other rigid foam insulation, with air channels carved or formed in the foam layer upper surface (i.e., the surface that interfaces with the inner or lower face of the panel). The air channels generally extend in an upward direction (i.e., from the eaves to the crown of the roof).

DETAILED DESCRIPTION OF EXEMPLARY EMBODIMENTS

Figure 1:
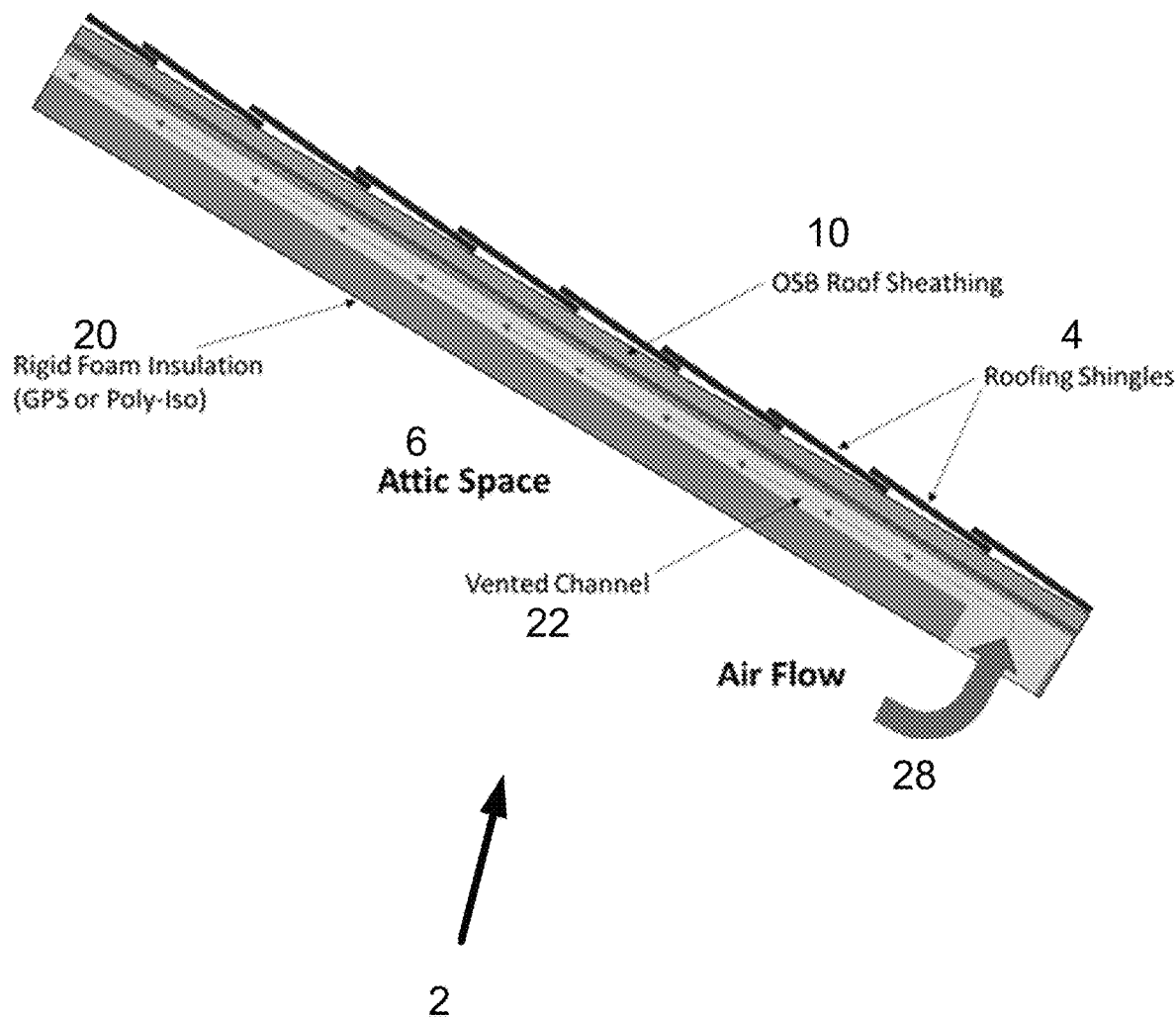
FIG. 1 shows a cutaway side view of a roof sheathing panel with rigid foam insulation with ventilation channels in accordance with an embodiment of the present invention.
Figure 2:
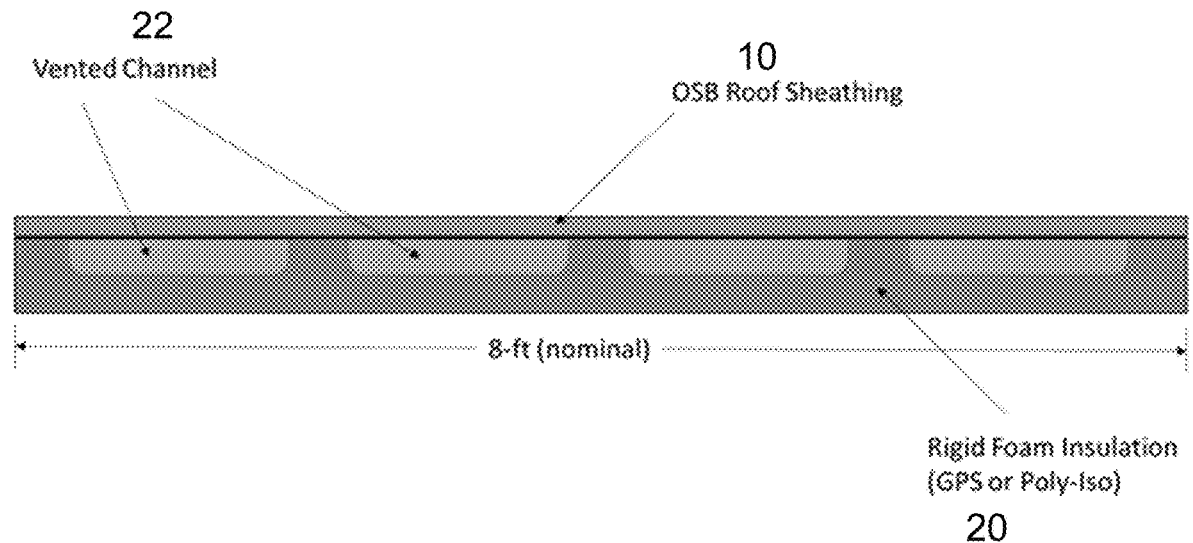
FIG. 2 shows a cutaway end view of the panel of FIG. 1.

In various exemplary embodiments, as seen in FIGS. 1 and 2, the present invention comprises an integrated roofing product 2 comprising a base or core wood or cellulosic structural or roof sheathing panel 10 with a rigid foam insulation sheet or layer 20 laminated or otherwise attached to the panel's inner face. Shingles 4 and/or other protective material may then be attached to the panel's outer face (this attachment make take place after installation of the integrated roofing product 2, or may take place in a production line or process at the factory, so that the shingles or outer protective material are part of the integrated roofing product). Use of a texturizing aggregate with an integrated roof panel is described in U.S. patent application Ser. No. 17/068,712, filed Oct. 12, 2020, which is incorporated herein in its entirety by specific reference for all purposes.

A plurality of parallel air channels 22 extend vertically in the rigid foam insulation sheet, providing a pathway for air to pass up and out of the eave space 8. In one exemplary embodiment, some or all of the air channels 22 are disposed on the surface of the foam layer that is laminated or attached to the panel's inner face, so that part of the air channel is formed at the interface. In this configuration, the upper part of the air channel is formed by the inner face of the panel.

In several embodiments, the base or core panel 10 comprises an oriented strand board (OSB) or other manufactured wood panel. The panel may be of any size suitable for the roofing installation, and a common size is 4 feet wide by 8 feet long, with a thickness ranging from ⅜" to ¹⁹⁄₃₂". The rigid foam insulation panel 20 comprises expanded polystyrene (EPS), extruded polystyrene (XPS), graphite polystyrene (GPS), or polyisocyanurate (Poly-Iso), or other rigid foam insulation, with air channels 22 carved or formed in the foam layer upper surface (i.e., the surface that interfaces with the inner or lower face of the panel). The air channels generally extend in an upward direction (i.e., from the eaves to the crown of the roof). In the embodiment with 4×8 panels, the 4-foot edge is the side that extend upward, so the air channels are parallel, or generally parallel, with the 4-foot side of the of the panel.

Figure 3:
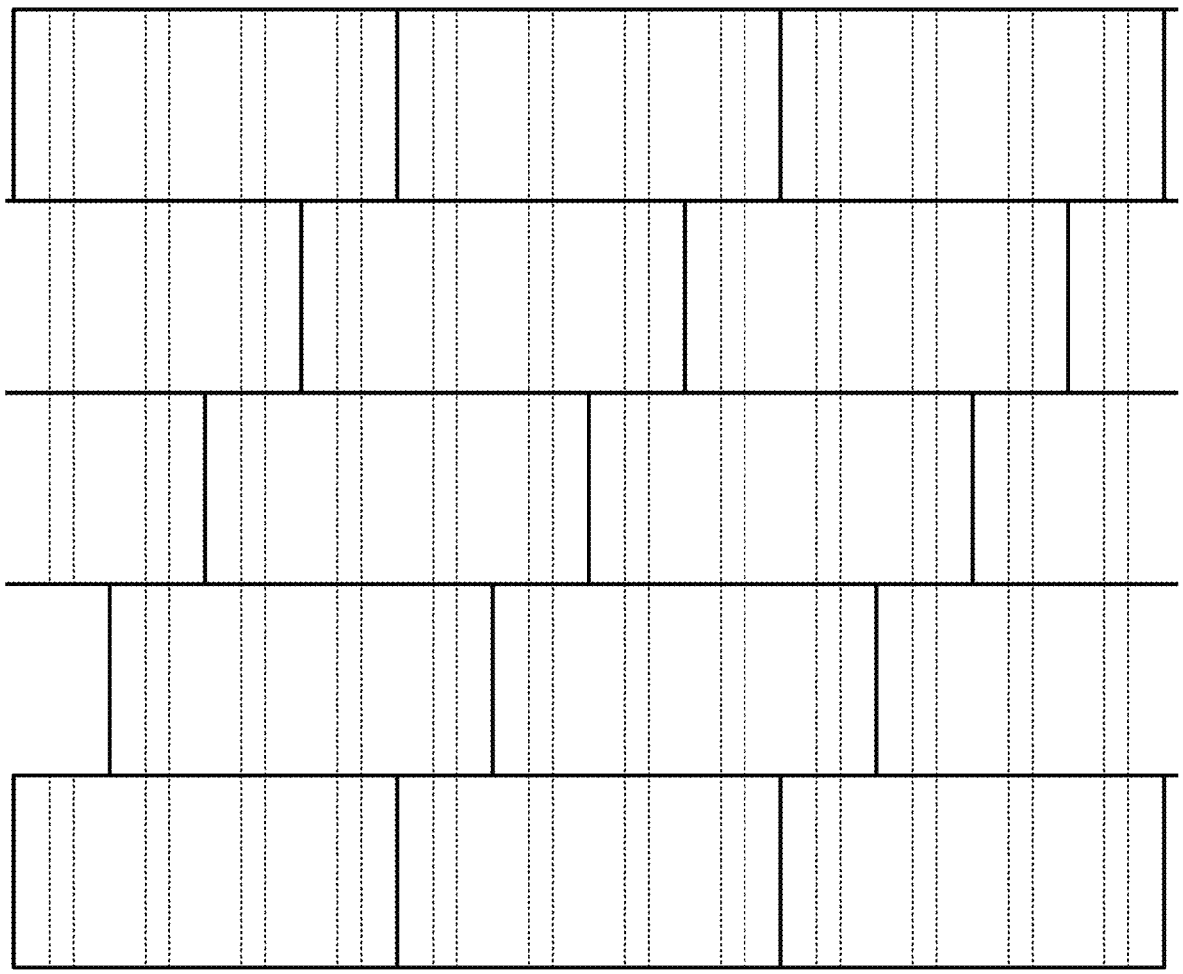
FIGS. 3-5 show partial top views of vertically adjacent rows of roof sheathing panels on a roof with different offset arrangements.
Figure 4:
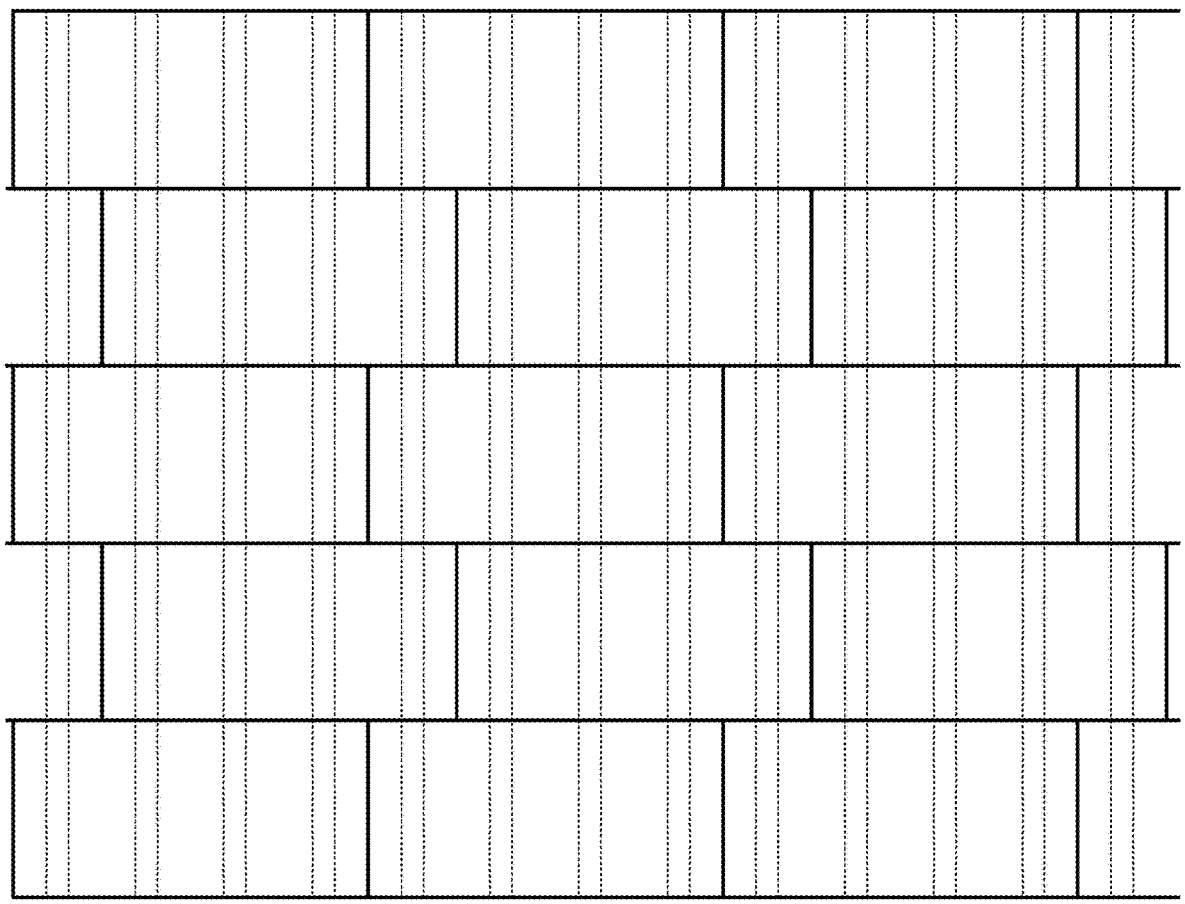
Figure 5:
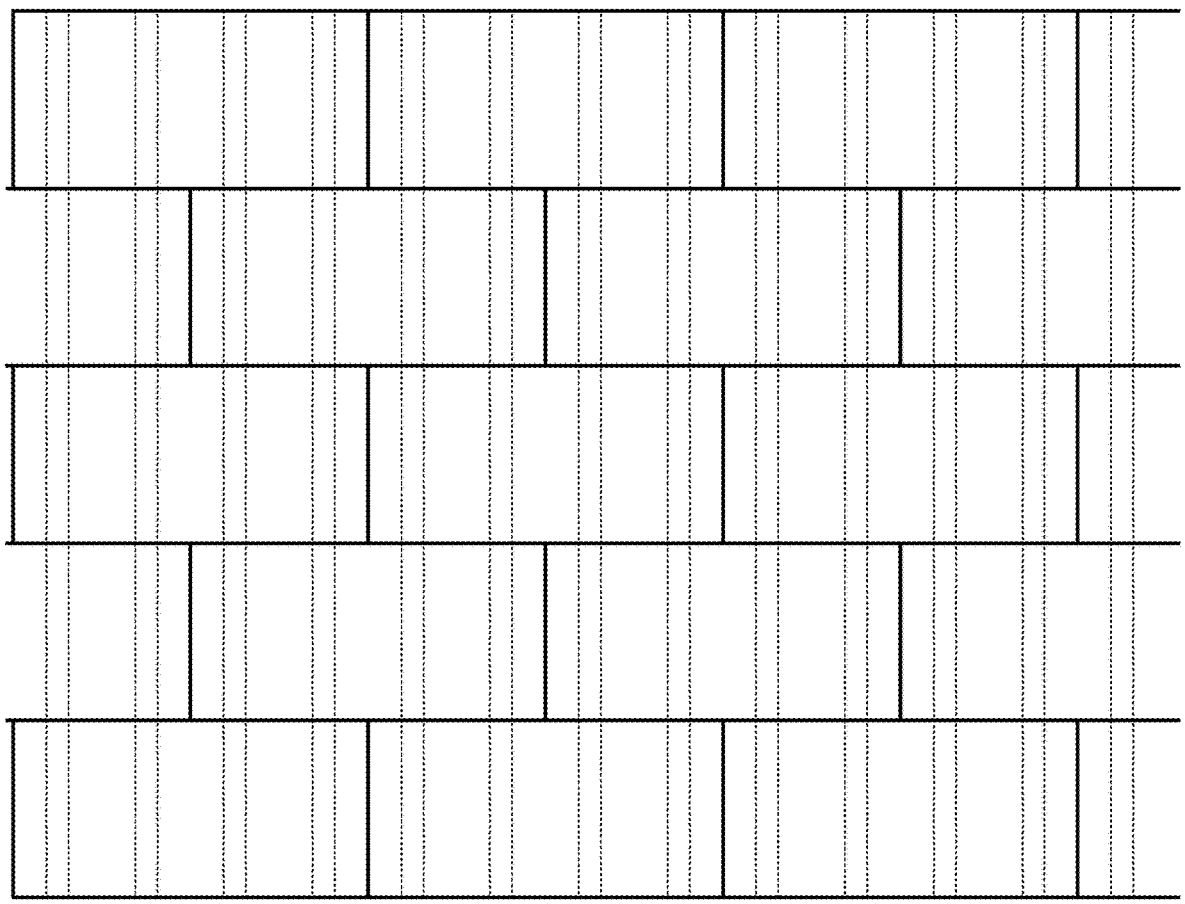
Figure 6:
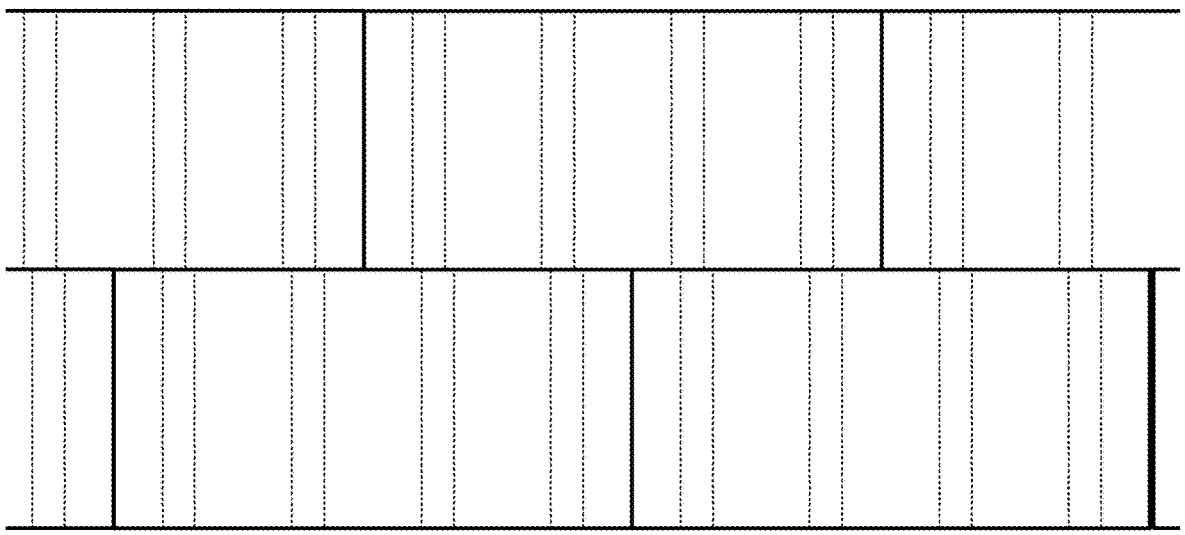
FIG. 6 shows a partial top view of vertically adjacent rows of roof sheathing panels on a roof with approximately 50% offset with partial channel alignment.

The integrated roofing product (panels with foam insulation layer, and possibly with a radiant barrier layer, as described below) are installed across support or roof rafters such that the 8-foot edge is perpendicular to these supports. In general, the first course of panels is installed along the bottom edge of the roof along the eave, with subsequent panels installed in an offset pattern (similar to bricks) to provide stability to the roof system. The base form of the integrated roofing product has one or more channels (four channels are shown in FIG. 2), with each channel being open along both 8-foot edges (i.e., the edges perpendicular to the roof support, and thus parallel to the roof ridge-line). As subsequent panels are offset, the openings of channels in adjacent panels match or overlap, thereby providing a continuous flow channel through multiple panels. In the four channel embodiment in FIG. 2, the channels are sized and placed so that the channels line up with a quarter (25%) offset as well as a half (50%) offset, as seen in FIGS. 3-5. The channels possess sufficient width so that there is still substantial overlap of the channel openings even with relatively substantial variations in panel offsets, as seen in FIG. 6. Other numbers and sizes of channels may be used. The channels may all be the same size, or some may differ in size. A particular channel also may vary in depth and or width along its length.

Once the entire roof has been sheathed, facial openings 28 may be cut into the foam layers at the area of the bottommost panels that extend over the eave, allowing air to travel up from the ventilated eave space into the air channels, through the sheathing to the ridge vent, and thence out into the open atmosphere. In some embodiments, the openings may be pre-formed or pre-cut at the factory during the manufacturing process, so that products with the facial openings may be installed as the bottommost panel row without the need to do so at the site.

Figure 7:
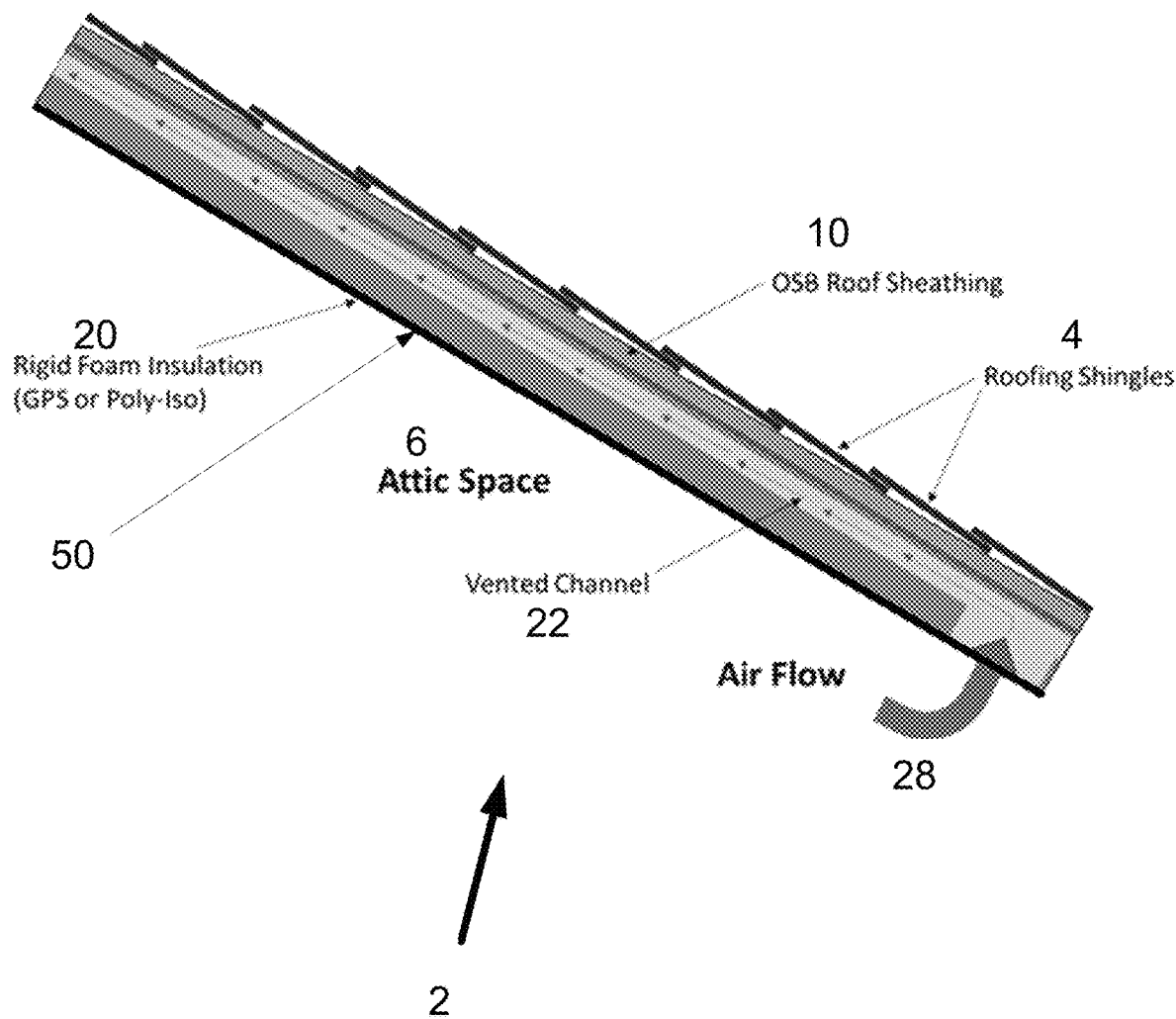
FIG. 7 shows a cutaway side view of the panel of FIG. 1 with a radiant barrier on the inner face of the foam layer.
Figure 8:
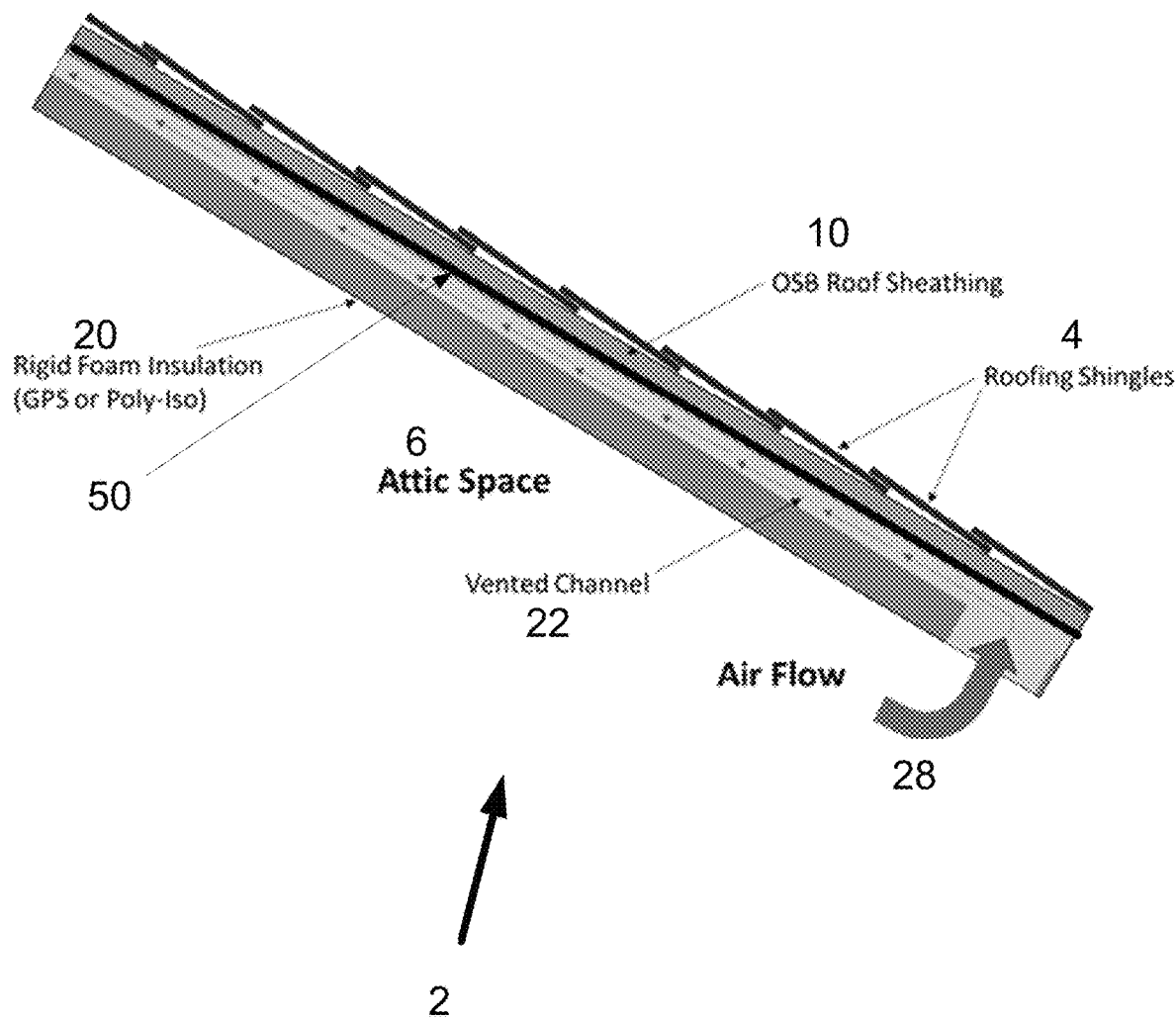
FIG. 8 shows a cutaway side view of the panel of FIG. 1 with a radiant barrier on the inner face of a base or core OSB sheathing panel.

In several exemplary embodiments, a radiant barrier (RB) layer 50 (typically a form of metallic foil) may be used in the present invention. In one embodiment, the RB may be attached to the inner surface of the foam insulation layer (i.e., opposite the sheathing panel), which is the side of the foam facing into the attic space, as seen in FIG. 7. In an alternative embodiment, the RB is laminated to one face of the base or core sheathing panel, then the foam insulation later is laminated over the RB such that a portion of the RB face of the sheathing is facing into the ventilation channels, as seen in FIG. 8. The RB layer thus may be integrated with the base or core sheathing panel and the foam insulation layer into the integrated roofing product as part of the factory manufacturing process.

The present invention helps reduce attic temperatures in warm climates, while also providing additional air flow through the roofing system to cool the exterior roofing materials and thereby extend their life. Greater ventilation through attic spaces also facilitates faster drying and reduces the risk of moisture buildup and its resulting problems.

The present invention possesses several advantages over prior art roof insulation systems such as that disclosed in Dysart, U.S. Pub. No. 2018/0087280 (application Ser. No. 15/330,278), which is incorporated herein by specific reference for all purposes. The present invention is manufactured as an integrated product at a factory, with the foam insulation layer laminated or attached to the inner side of the base/core panel. The combined product thus, in several embodiments, may act as the roof deck, with the inner face of the foam insulation layer (opposite the base/core panel) facing the attic space, and possibly exposed thereto. The foam insulation layer is not placed over the top of the roof deck, as described in Dysart. Further, when used with a radiant barrier on the inner face of the foam insulation layer, the radiant barrier is then exposed to the open air space in the attic, as necessary for proper function of a radiant barrier. That is, the inner face of the radiant barrier is not covered by another layer. Radiant barriers function by reducing heat transfer by radiation (as opposed to conduction and convection), and thus the radiant barrier must face an air space to function properly as radiation moves through space. A radiant barrier that is sandwiched between two panels or solid surfaces will simply conduct heat, and cannot act as a radiant barrier.

The present invention also can be configured so that the radiant barrier is on the inner face of the base/core panel, with exposure to the open air space formed by the air channels. In this configuration the radiant barrier is still on the inner side of the base/core panel, and thus continues to be located on the underside of the base/core panel. This is in sharp contrast to Dysart where the radiant barrier is located on the upper/outer side of the roof decking layer.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. An integrated roofing panel system, comprising:
    two or more engineered wood roof sheathing base panels comprising lignocellulosic material, with an inner face and an outer face; and
    a foam insulation layer with an inner face and an outer face, disposed on the inner face of the roof sheathing base panel, wherein the roof sheathing base panel and the foam insulation layer are pre-formed into an integrated multi-layer arrangement;
    wherein the foam insulation layer comprises a plurality of parallel channels running continuously from a first edge of the foam insulation layer to a second edge of the foam insulation layer, wherein the first edge is opposite the second edge, wherein the plurality of parallel channels in the foam insulation layer are not in connection with each other; and
    wherein the plurality of parallel channels have openings at the first edge and the second edge, and said openings are adapted to meet corresponding openings on an adjacent integrated roofing panel when said adjacent integrated roofing panels are placed with respective said first edges in contact with respective said second edges, thereby forming a continuous air passageway through corresponding said plurality of parallel channels; and
    at least one modified engineered wood roof sheathing base panel comprising one or more facial openings at the first edge of the corresponding foam insulation layer, said facial openings extending from the inner face of the corresponding foam insulation layer to some or all of the corresponding plurality of parallel channels.

2. The integrated roofing panel system of claim 1, further where the outer face of the foam insulation layer is laminated to the inner face of the roof sheathing base panel.

3. The integrated roofing panel system of claim 2, wherein the foam insulation layer is laminated to the inner face prior to installation of the integrated roofing product on a roof.

4. The integrated roofing panel system of claim 1, wherein the plurality of parallel channels are on the outer surface of the foam insulation layer, so that channels are formed at the interface of the foam insulation layer and the roof sheathing base panel.

5. The integrated roofing panel system of claim 1, further wherein the at least one modified engineered wood roof sheathing base panel comprises a radiant barrier.

6. The integrated roofing panel system of claim 5, wherein the radiant barrier is affixed to the inner face of the foam insulation layer.

7. The integrated roofing panel system of claim 6, wherein the radiant barrier is exposed to attic air space when installed.

8. The integrated roofing panel system of claim 5, wherein the radiant barrier is affixed to the inner face of the roof sheathing base panel.

9. The integrated roofing panel system of claim 8, wherein the radiant barrier is exposed to the air space in the plurality of parallel channels.

10. A roofing system, comprising:
    two or more integrated roofing panels according to claim 1, wherein each channel comprises openings on opposite edges of the respective roofing panel;
    wherein the two or more integrated roofing panels are installed on a roof in successive rows of panels, one above the other, in an offset pattern;
    wherein the offset pattern is determined such that said openings of channels in adjacent rows of panels align to provide continuous air flow pathways to the roof ridge through said channels.

11. A method of installing a roof with an eave and a ridge on a structure, comprising: providing a plurality of integrated roofing panels according to claim 1, wherein each channel of the plurality of parallel channels comprises openings on opposite edges of the respective integrated roofing panel;
    installing a first row of adjacent said integrated roofing panels along the eave of the roof, wherein said first row comprises the modified engineered wood roof sheathing base panel according to claim 1, wherein the facial openings face inward; and
    installing successive rows of adjacent said integrated roofing panels, wherein each row is offset from the immediately vertically adjacent rows;
    wherein the offset is determined such that the openings of the plurality of parallel channels in vertically adjacent rows align to provide continuous air flow pathways through said plurality of parallel channels.

* * * * *